(12) United States Patent
Campbell et al.

(10) Patent No.: US 8,798,117 B1
(45) Date of Patent: Aug. 5, 2014

(54) RAKE RECEIVER METHODS AND APPARATUS

(75) Inventors: Colin Campbell, Cambridge (GB); Oliver Charlesworth, Cambridge (GB)

(73) Assignee: Spidercloud Wireless Inc, Santa Clara, CA (US)

( * ) Notice: Subject to any disclaimer, the term of this patent is extended or adjusted under 35 U.S.C. 154(b) by 1069 days.

(21) Appl. No.: 12/549,675

(22) Filed: Aug. 28, 2009

Related U.S. Application Data (60) Provisional application No. 61/093,149, filed on Aug. 29, 2008.

(51) Int. Cl.
*H04B 1/00* (2006.01)

(52) U.S. Cl.
USPC ........... 375/148; 375/150; 375/152; 375/347; 375/349

(58) Field of Classification Search
USPC .................. 375/130, 140–150, 152, 316, 320, 375/324–326, 329, 340, 342–343, 346–350
See application file for complete search history.

(56) References Cited

U.S. PATENT DOCUMENTS

| | | | |
|---|---|---|---|
| 5,999,560 A * | 12/1999 | Ono | 375/148 |
| 2003/0114125 A1 * | 6/2003 | Sourour et al. | 455/133 |
| 2005/0130616 A1 * | 6/2005 | Khayrallah et al. | 455/242.2 |
| 2006/0067383 A1 * | 3/2006 | Cozzo et al. | 375/147 |

* cited by examiner

*Primary Examiner* — Sam K Ahn
*Assistant Examiner* — James M Perez
(74) *Attorney, Agent, or Firm* — Straub & Pokotylo; Michael P. Straub; Stephen T. Straub (57) ABSTRACT

Methods and apparatus for efficiently implementing a rake receiver which allows for rake receiver elements, e.g., fingers, to be dynamically assigned to antenna elements are described. In at least some embodiments multiple antennas are used. Rake elements are allocated to antennas in a dynamic manner with sets of weights also being assigned dynamically, e.g., based on channel estimates. Rake finger assignment to antenna's is made, in some embodiments, to maximize signal recovery taking into consideration the channel conditions detected by each antenna for the various delays that may be supported. Through the dynamic assignment of rake finger's to antenna's, a single rake finger may be coupled to different antennas at different times allowing for more efficient use as compared to systems where rake fingers are dedicated on a fixed basis to an individual antenna.

13 Claims, 7 Drawing Sheets

RAKE RECEIVER METHODS AND APPARATUS

RELATED APPLICATION

This application claims the benefit of the filing date of U.S. Provisional Application No. 61/093,149, filed on Aug. 29, 2008, and entitled "RAKE RECEIVER METHODS AND APPARATUS," and which is hereby expressly incorporated by reference in its entirety.

FIELD

The present application is directed to methods and apparatus for implementing and using rake receivers and, more particularly, to rake receivers which allow for dynamic allocation of elements to antennas.

BACKGROUND

Figure 1:
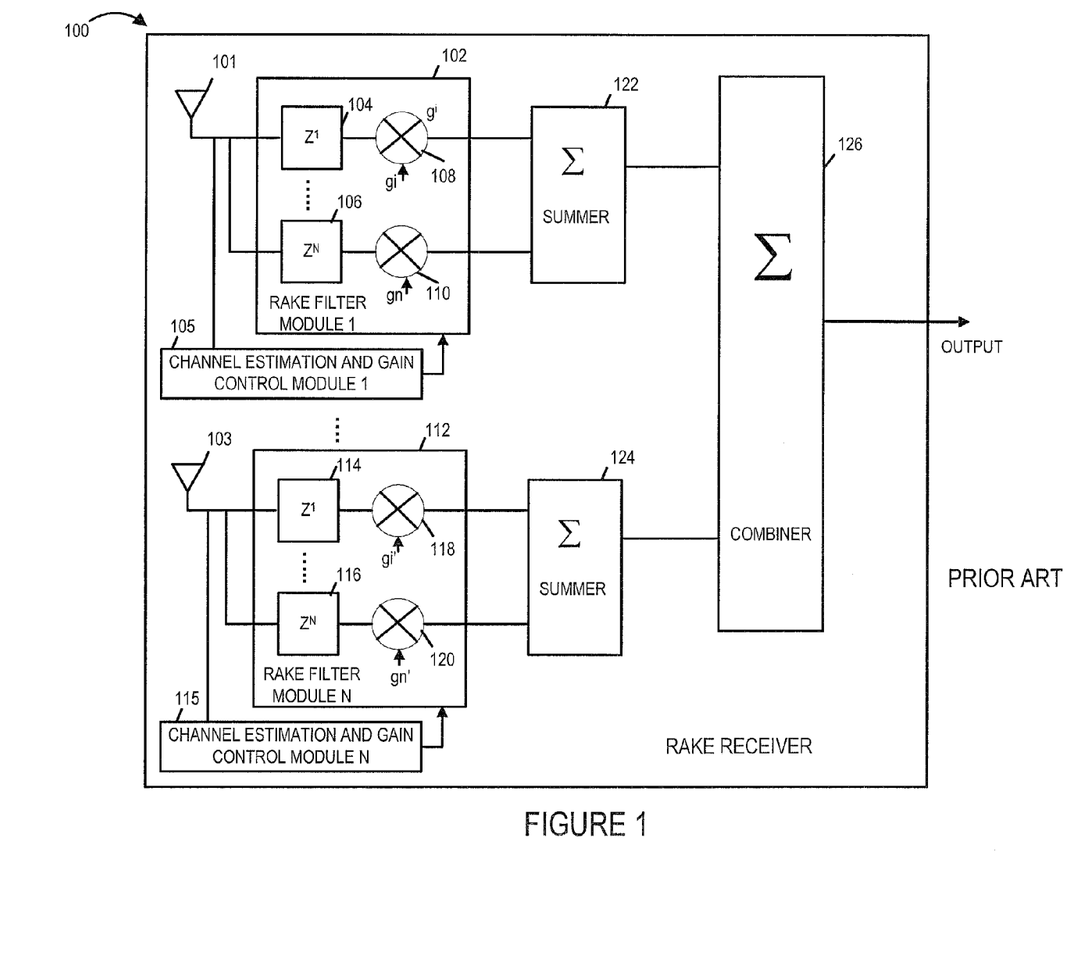
FIG. 1 illustrates a known rake receiver.

Rake receivers are well known. FIG. 1 illustrates an example 100 of one known rake receiver implementation. In the known rake receiver 100 separate rake filter modules 102, 112 are coupled to corresponding individual antennas 101, 103. Each filter module 102, 112 includes plurality of N fingers where each finger includes an individual delay element 104, 106, 114, 116 and a corresponding gain control element 108, 110, 118, 120. A first channel estimation and gain control module 105 is coupled to, and controls, the first rake filter module 102. A second channel estimation and gain control module 115 is coupled to, and controls, the second rake filter module 112. Each of the channel estimation and gain control modules 105, 115 perform a channel estimation operation for the channel corresponding to the individual antenna 101, 103 to which they are attached. As should be appreciated, a transmitted signal may follow multiple paths, e.g., due to reflections from buildings, etc., on its way to one of the antennas. Applying different delays and then combining the delayed signals can improve signal recovery by creating a composite signal from the delayed versions of the received signal. To achieve a coherent composite signal, each of the delayed versions of the received signal is subject to a different gain to reflect the signals contribution to the combined signal with the gain being a function of the estimated channel, e.g., with delayed signals more closely matching the main signal being weighted more heavily than delayed signal elements differing greatly from the main signal. The gains of the different delayed versions of the received signal are weighted according to the channel estimate generated by one of the separate channel estimation and gain control modules 105, 115.

In the illustrated system, the outputs of the individual rake fingers of module 102 are combined by a first summer 122 while the outputs of the rake fingers of rake filter module N 112, are combined by a second summer 124. The output of the two summers 122, 124 are then combined by a third summer 126 which is responsible for generating the combined signal produced from the output of antenna's 101, 103.

In the rake receiver 100, there are N rake fingers for each antenna 101, 103. In some cases, a single antenna 101, 103 may be the primary contributor to the combined output signal with the rake fingers coupled to the other antenna or antennas contributing little if anything to the combined output signal. However, in some cases, different fingers corresponding to different antennas may contribute significantly to the combined output signal. When fingers corresponding to different antennas are contributing significantly to the combined signal, often some fingers corresponding to one or both antennas will have very little contribution to the combined signal and may even have a gain set to zero reflecting their lack of useful contribution. Thus rake fingers which contribute little or not at all to the combined signal represent a potential waste of hardware resources.

It should be appreciated that the illustrated rake receiver 100 is hardware intensive in that each of the rake filter modules 102, 112 includes N rake fingers. In addition, two levels of signal summation are used to generate the output signal.

It would be desirable if methods and/or apparatus could be developed to reduce the hardware requirements for implementing rake receivers. In particular, it would be desirable if rake finger elements could be dynamically allocated and re-assigned to antennas to reduce total hardware requirements. In addition, it would be desirable if the rake fingers could be implemented in a flexible manner, e.g., with controllable delay and/or gain elements being included in one or more rake fingers.

SUMMARY

Methods and apparatus for efficiently implementing a rake receiver which allows for rake receiver elements, e.g., fingers, to be dynamically assigned to antenna elements are described. In at least some embodiments multiple antennas are used. Rake elements are allocated to antennas in a dynamic manner with sets of weights also being assigned dynamically, e.g., based on channel estimates. Rake finger assignment to antenna's is made, in some embodiments, to maximize signal recovery taking into consideration the channel conditions detected by each antenna for the various delays that may be supported. Through the dynamic assignment of rake finger's to antenna's, a single rake finger may be coupled to different antennas at different times allowing for more efficient use as compared to systems where rake fingers are dedicated on a fixed basis to an individual antenna.

DETAILED DESCRIPTION

Figure 7:
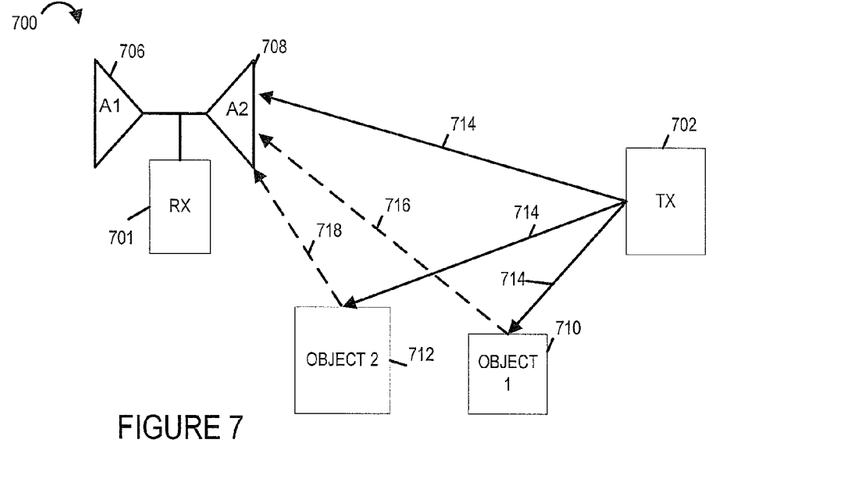
FIG. 7 illustrates an exemplary system in which a wireless terminal including a rake receiver module implemented in accordance with the invention may be used.

An exemplary system 700 in which the present invention may be used is shown in FIG. 7. The system includes a wireless terminal (WT) 701, a first object 710, a second object 712 and a transmitter 702. The wireless terminal 701 includes a first antenna A1 706 and a second antenna A2 708 having the directivity. The first and second objects 710, 712 may be building walls or other surfaces which may reflect signals transmitted by transmitter 702. Transmitter 702, which may be part of a base station or other wireless terminal, transmits signal 714. Signal 714 is directly received by antenna A2 708. Signal 714 is reflected off object 710 as signal 716 which is also received at antenna A2 but at a time which is later than the time at which signal 714 is directly received since the reflected signal travels a longer path to antenna A2 than the directly received signal. Similarly signal 718 represents the reflection of signal 714 and, while being received at A2 708, like signal 716 it is delayed relative to the directly received signal 714. In most, but not necessarily all cases, the directly received signal will be stronger than the delayed signals. Note that while signals 714, 716, 718 which each represent a different received portion of the transmitted signal 714 are received by antenna A2 708, antenna A1 706 is directed away from transmitter 702 and does not receive a meaningful or significant portion of the transmitted signal 714.

In accordance with the present invention, a limited resource, e.g., rake fingers of a receiver, are dynamically allocated to antenna elements and controlled in an attempt to maximize recovery of a signal of interest, e.g., the signal from transmitter 702. One or more rake fingers may be assigned to an individual antenna.

Figure 8:
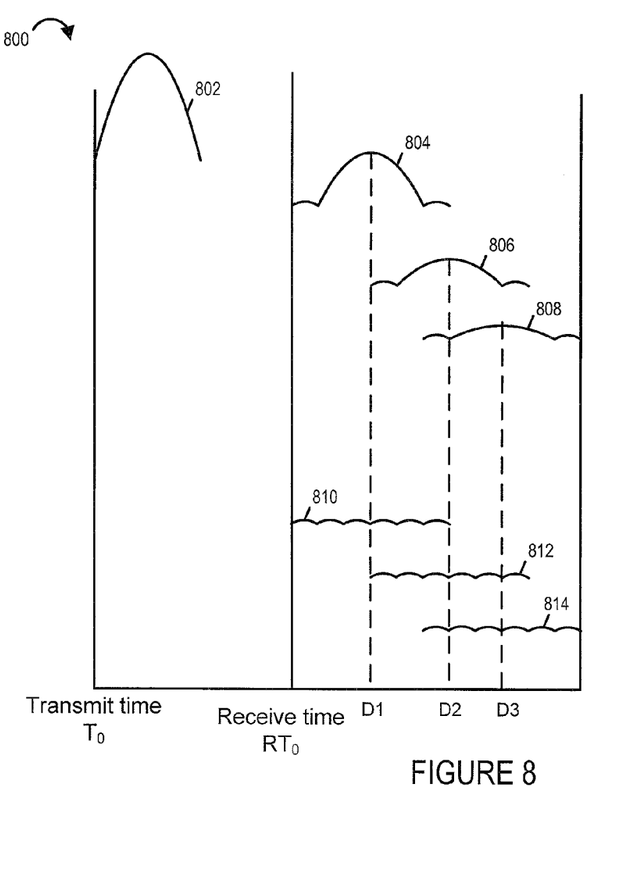
FIG. 8 illustrates an exemplary signal that may be transmitted to the wireless terminal shown in FIG. 7 and the type of signals which may be received at the different antennas of the wireless terminal shown in FIG. 7, e.g., due to reflections and/or other channel delays as well as the directivity of the wireless terminal's antennas.

FIG. 8 is a signal diagram 800 showing the signal 714 which may be transmitted and what may be received at antennas A2 and A1 respectively. Signal 802 represents the output signal 714 of transmitted 702. Signals 804, 806, 808 represent signals 714, 716, 718 which are received at antenna A2 while signals 810, 812, 814 represent signals which are received at antenna A1 706. $RT_0$ represents the point at which signal 804 begins being received. Note that signal 804 being the directly received signal received at the antenna facing the transmitter 702 is relatively large while the signals 806 and 808 corresponding to reflections are each smaller in size, with signal 808 corresponding to one of the signals 716, 718 corresponding to the longer path between transmitter 702 and antenna A2. Note that signals 810, 812, 814 do not include any meaningful portion of signal 714 and are predominantly noise.

As is known in the art, the signal delay associated with different signal paths can be determined as part of the channel estimation process with different delays being associated with different strength versions of the transmitted signal. As part of the channel estimation process, which channel delays correspond to the largest signal components can be determined. Delays may, and often are, associated with gains for purposes of controlling rake fingers with a gain and delay value being generated for each of the rake fingers which might be used. A greater gain is associated with a delay that corresponds to a stronger signal component than a weaker one. For example, the gain associated with delay 1 would be higher than the gain associated with delay 2 which would be higher than the delay associated with delay 3.

In accordance with one feature of the invention, channel estimate information is generated for each antenna with the generated information being suitable to control one or more rake elements, e.g., in some cases with the information for each antenna being able to control at least upto the number of rake fingers which are available.

Consider for example the WT 701 shown in FIG. 7. Channel estimates for antennas A1 and A2 would be generated. Assuming that 3 rake fingers where available for dynamic allocation between A1 and A2, based on the channel estimates two sets of gain and delay information would be generated. Each set would include, e.g., three elements where each element included the information for controlling one rake finger. The information might also include some value indicating the overall relative significance of the element to signal recovery which can be used for determining the overall importance that a particular gain/delay pair be used. Thus, in the FIG. 7 example, two sets of gain and delay information might be generated, each including 3 elements.

The sets might be as follows:

Set For A2=(E1=[(G1, D1), S1]; E2=[(G2, D2), S2]; [G3, D3), S3]

Set For A1=(E1=[(G4, D0, S4]; E2=[(G5, D2), S5]; [G6, D3), S6];

where D1, D2 and D3 are different delays; and where G represents a gain value, D represents a delay value and S represents a significance measure;

where G1>G2>G3 where S1>S2>S3 and where S4, S5 and S6 are all less then S3 and G4, G5, G6 are all less than G3.

In such a case, the three available rake fingers would be allocated to antenna A2 with the delay/gain pairs (G1, D1), (G2, D2); (G3, D3) being used to control the first, second and third rake fingers, respectively, coupled to antenna A2.

As should be appreciated, such a dynamic allocation of rake fingers to antennas facilitates signal recovery where a limited number of rake fingers are available.

In this example, no rake fingers are allocated to A1 which does not receive a meaningful portion of the transmitted signal 714 while signal recovery is facilitated by combining multiple delayed versions of the transmitted signal received via antenna A2. It should be appreciated that while in the example all the rake fingers are allocated to one of the two antennas, however in other cases this may not be the case. Where more than two antennas are used, it is likely that significant portions of a transmitted signal will be received on more than one antenna in which case the rake fingers would be allocated to multiple antennas with the number of rake fingers allocated to an individual antenna depending on the expected significance it can make to recovering a transmitted signal.

Channel estimates and/or the significance measure (S) may be based on one or more pilots received from the transmitter 702. The received signal strength of the one or more pilots may be the basis of the significance measure.

In FIG. 8 example, while D1, D2, D3 are shown being measured from $RT_0$, it should be appreciated that another reference point may be used other than $RT_0$ for determining the delays used to control the delay elements of the rake fingers.

Figure 2:
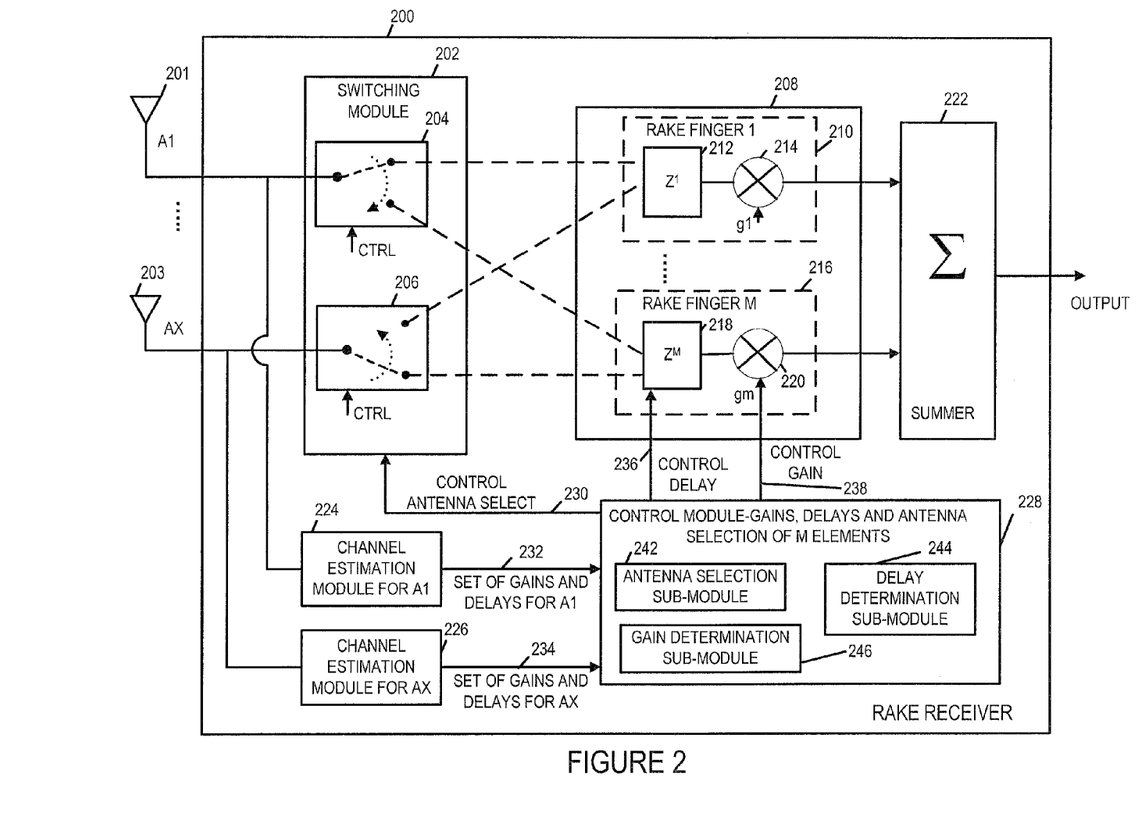
FIG. 2 illustrates an exemplary rake receiver implemented in accordance with one exemplary embodiment.

FIG. 2 illustrates an exemplary rake receiver 200 implemented in accordance with one exemplary embodiment. As shown, the exemplary rake receiver 200 is coupled to a set of antennas A1 201 through Ax 203. The rake receiver 200 includes a switching module 202, a rake finger assembly 208, a summer 222, a first channel estimation module 224, an additional channel estimation module 226 which are coupled together as shown in FIG. 2. While two antennas are shown, it should be appreciated that any number of X antennas may be supported where X is a positive integer greater than one. The switching module 202 includes a controllable switch for each antenna. First controllable switch 204 selectively couples the first antenna 201 to one of the rake finger modules 210, 216 of the rake finger assembly 208. Similarly the Xth switch 206 couples antenna Ax 203 to one of the rake finger modules 210, 216. The coupling of antennas to rake finger modules is controlled by the control module 228 via antenna select control input which controls the switching of the individual switches 204, 206.

The rake finger assembly 208 includes a plurality of M rake finger modules including modules 210, 216 each of which is coupled to one of the antennas 201, 203 under control of control module 228. The coupling of rake finger modules 210, 216 can be changed dynamically to reflect changes in channel conditions and to optimize the use of the limited number of M rake fingers between the available antennas. For example, none, all, or some of the M rake fingers may be allocated to any one of the antennas 201, 203 at a given time depending on channel conditions thereby allowing for signal recovery, e.g., in a more optimum manner than when rake fingers are dedicated in a fixed manner to an antenna, using a limited number of rake fingers which can be reassigned from one antenna 201, 203 to another in a dynamic manner.

Thus, in the exemplary embodiment illustrated in FIG. 2, rake fingers are dynamically assigned to antennas 201, 203 under direction of a control module 228. Control module 228 receives channel estimation information from a first channel estimation module 224 corresponding to antenna A1 201 and channel estimation information from a second channel estimation module 226 corresponding to antenna Ax which controls a switching module 202. The channel estimation information generated by modules 224, 226 include for each of the antennas A1 and Ax, respectively, a set of gain and delay information, in the form of a gain and delay pair intended to control the rake finger components, as well as some indication as the expected contribution of the received signal corresponding to a particular gain and delay pair. A similar set 234 of information is received for antenna Ax. Thus, control module 228 receives a set of M gain and delay value pairs from each of the channel estimation modules 224, 226.

In contrast to the known system 100, where control of the rake fingers is performed separately for each antenna, in the FIG. 2 embodiment control module 228 makes a decision based on the received sets of channel information corresponding to different antennas with the available rake finger modules 210, 216 being allocated to the antennas according to which allocation will have the most beneficial impact with regard to producing a combined signal from the multiple antennas 201, 203. For each of the available M rake finger modules 210, 216 the control module selects the applicable antenna, gain and delay to be used based on the received set of information 232, 234. Individual sub-modules 242, 244, 246 work together to make these determinations, respectively.

The switching modules 204, 206 corresponding to rake fingers 210, 216 are controlled based on the antenna selected, e.g., by antenna selection sub-module 242, as corresponding to the rake finger at a given point in time. As illustrated in FIG. 2, each of the rake finger module 1, M includes a controllable delay element 212, 218 and a gain element 214, 220. The delay element 212, 218 of an individual rake finger is controlled by the determined delay while the gain is controlled by the determined gain corresponding to the module, e.g., with the gain and delays having been originally provided in the set of gain and delay information 232, 234.

In the FIG. 2 embodiment, the outputs of the individual rake fingers 210, 216 produced by subjecting an antenna output to the delay and gain corresponding to the individual rake fingers, are combined by a summer 222 prior to the combined signal being output by the rake receiver, e.g., to another device for further processing which may include, for example, signal decoding. Note that in the FIG. 2 embodiment, the rake finger outputs corresponding to one or more antennas, depending on the allocation of rake fingers at any given point in time, are combined in a single stage summing process by summer 222. This is in contrast to the multi-stage summing approach of the known system shown in FIG. 1 where the outputs corresponding to individual antennas are first combined and then subjected to further signal combining. While single level summing is shown in FIG. 2 and can have implementation advantages over multiple stage summing, the outputs of the rake fingers 210, 216 could be combined in stages to produce the rake receiver output signal if desired. Accordingly, use of single stage summer 222 is not critical to the invention although it is used in some embodiments.

Figure 3:
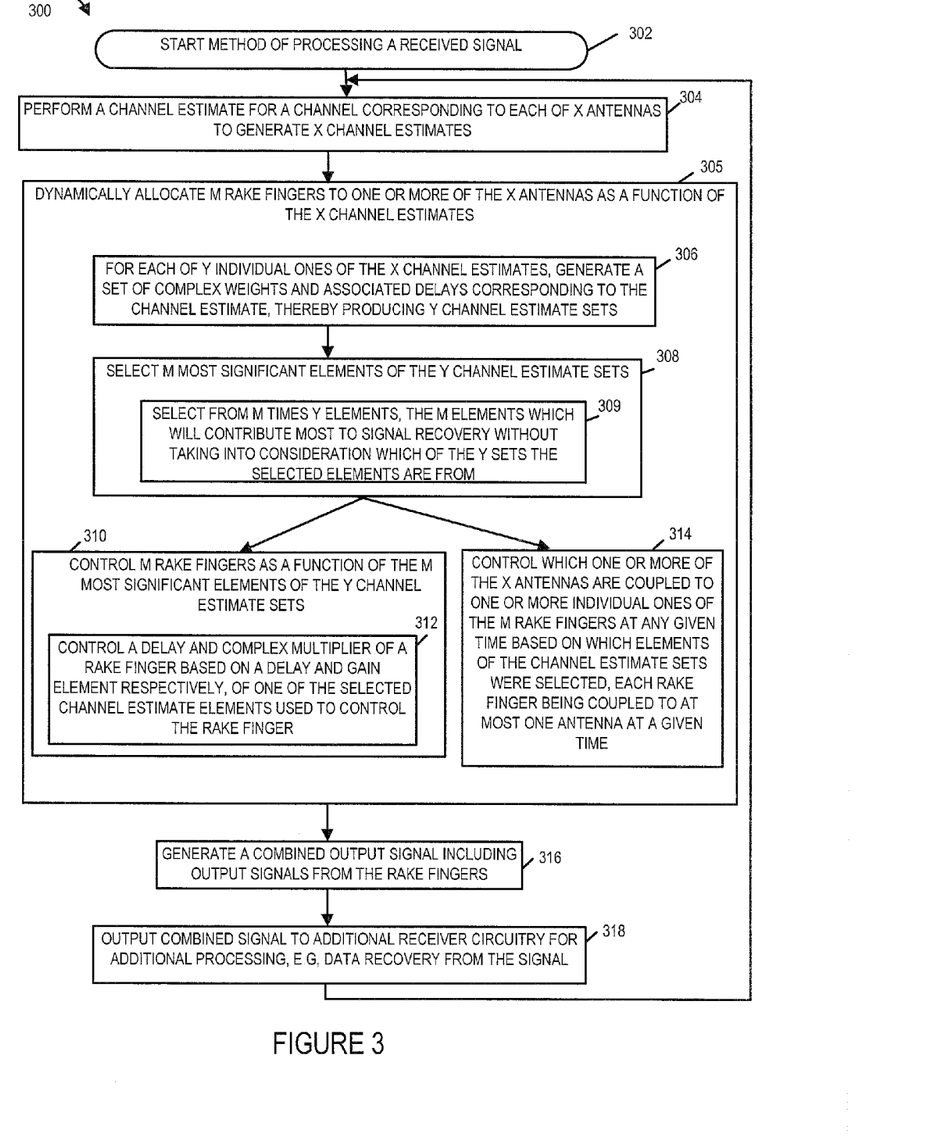
FIG. 3 illustrates a method of processing a received signal in accordance with one exemplary embodiment, e.g., an embodiment which may use the rake receiver of FIG. 2.

FIG. 3 is a flowchart 300 illustrating the steps of an exemplary method of processing a received signal implemented in some embodiments. The method 300 may, and in some embodiments is implemented by the exemplary rake receiver 200 shown in FIG. 2.

Operation starts in step 302 where the rake receiver 200 is powered on and initialized. Operation proceeds from the start step 302 to step 304. In step 304 channel estimation is performed for a channel corresponding to each of the x antennas, e.g., antennas 201, 203 coupled to the rake receiver 200, to generate x channel estimates. As discussed in the FIG. 2 embodiment of the rake receiver, the channel estimation for the channel corresponding to each of the individual antennas A1 through Ax, is performed by the individual channel estimation modules, e.g., channel estimation module 224 which receives input from antenna 201, and estimation module 226 which receives input from antenna 203.

Operation proceeds from step 304 to step 305. In step 305 the rake receiver dynamically allocates M rake fingers to one or more of the x antennas as a function of the x channel estimates. In some embodiments the elements of the rake receiver, e.g., the control module 228 and the switching module 202 work together to perform the dynamic allocation of the M rake fingers to one or more of the x antennas. In various embodiments the step 305 of dynamically allocating the M rake fingers includes various sub steps 306 through 314. Thus in at least some embodiments, as part of performing step 305, various steps 306 to 314 are performed.

In step 306, the rake receiver generates, for each of y individual ones of the x channel estimates, a set of complex weights and associated delays corresponding to the channel estimate, thereby producing y channel estimate sets, where x and y are positive integers. In some embodiments y is equal to x. In at least some embodiments y is greater than 1. In some embodiments each channel estimate set includes M elements, e.g., equal to the number of rake fingers. In some embodiments each of the y channel estimate sets includes the same number of elements, e.g., same number of gain and delay pairs. In some such embodiments the same number of elements is equal to the number of rake fingers, e.g., M as in the case of the rake receiver shown in FIG. 2. In at least one embodiment the total number of rake fingers is fixed. In some embodiments each channel estimate set includes Z elements, where each Z of the elements includes at least one gain value and one delay value, Z being an integer value greater than 1. Thus in some embodiments Z is equal to the number of rake fingers. The set of complex weights and associated delays for each individual one of the x channel estimates is generated in at least some embodiments by the channel estimation modules 224, 226. The information including sets of gains and delays, from each of the channel estimation modules 224, 226 is provided to the control module 228. In accordance with one embodiment of the present invention, the information including sets of gains and delays received from the channel estimation modules 224, 226 also includes some indication of the expected contribution of the received signal corresponding to a particular gain and delay pair. The control module 228 in some embodiments may use this received information to control the allocation of various individual rake fingers 1 through M to one or more antennas.

Operation proceeds from step 306 to step 308. In step 308, the control module 228 selects M most significant elements, e.g., gains and associated delays, of the y channel estimate sets. As discussed above, in some embodiments each channel estimate includes M elements. Thus for y channel estimate sets, there area total of M times y elements. In some such embodiments the control module 228 selects from M times y elements, the M elements which will contribute most to signal recovery without taking into consideration which of the y sets the selected elements are from, as shown in sub step 309. Thus the selection of the M most significant elements is sometimes based on the indication of the expected contribution of the received signal corresponding to a particular gain and delay pair, so that the elements that have significant and most beneficial impact in producing a combined signal from the multiple antennas 201, 203, are selected. As discussed earlier, each channel estimate set corresponding to an antenna includes Z elements, it is sometimes possible that more than one element, e.g., gain and delay pair, corresponding to a single antenna may be selected if considered significantly contributing to produce the combined signal. Hence it is possible that more than one rake finger may be assigned to a single antenna. Thus, out of the M most significant elements, it is possible that one or a plurality of selected elements correspond to a channel estimate set generated for one single antenna.

The operation proceeds from step 308 to step 310 and step 314 which may be performed asynchronously in parallel. In step 310 the control module 228 controls M rake fingers as a function of the selected most significant elements of the y channel estimate sets. In some embodiments step 310 of controlling the M rake fingers includes performing step 312 wherein the control module 228 controls a delay and complex multiplier (gain) of a rake finger based on a delay and gain element, respectively, of one of the selected channel estimate elements used to control the rake finger. Thus, using the selected elements of the channel estimate sets, the gain, e.g., 214, 220 and delay 212, 218 of each one of the M rake fingers 210, 216 can be controlled. It should be appreciated that the gain and delay corresponding to each of the M rake fingers is adjusted based on the selected elements so that the rake finger with correctly adjusted gain and delay can be assigned to an antenna at a given time. This helps in the correct gain and delay being applied to the signal received on the antenna to which the rake finger is being assigned.

The control module 228, in addition to controlling the gains and delays for the individual rake fingers, also controls the selection of the antennas to which one or more rake fingers can be coupled to, at any given time. In step 314 the control module 228 controls which one or more of the x antennas are coupled to one or more individual ones of the M rake fingers at any given time based on which elements of the channel estimate sets were selected, each rake finger being coupled to at most one antenna at a given time. For example, a channel estimate set corresponding to antenna 201 includes Z elements and consider that one element, e.g., one gain and delay pair, from the channel estimate set corresponding to antenna 201 is selected in the M most significant elements selected by the control module 228. Now consider that gain and delay components of a rake finger, e.g., a rake finger 1, are controlled/adjusted based on the selected element from the channel estimate set corresponding to antenna 201. Following this, the control module 228, being aware of the selected element from the channel estimate set corresponding to antenna 201, controls the antenna 201 to be coupled to the rake finger 1 at a given time, so that a received signal on antenna 201 can be processed using the appropriate rake finger for which the gain and delay has been adjusted, i.e., rake finger 1 in this example. It should be appreciated that it is possible that more than one rake finger is allocated to the antenna 201 by the control module 228, e.g., in the event when more than one gain and delay pairs from the channel estimate set corresponding to antenna 201 is selected in the M most significant elements. It should be further appreciated that a single rake finger may be dynamically assigned to different antennas at different points in time which allows for more efficient use of the rake fingers as compared to systems where rake fingers are dedicated on a fixed basis to an individual antenna. Operation proceeds from step 305 which includes steps 306, 308, 309, 310, 312, and 314, to step 316.

It should be appreciated that the control module 228 makes the allocation decision based on the received sets of channel information corresponding to different antennas in a way that the available rake fingers 210, 216 are allocated to the antennas such that the allocation of the rake fingers will have the most beneficial impact with regard to producing a combined signal from the multiple antennas 201, 203.

Returning to step 316. In step 316 a combined signal is generated, e.g., by the summer 222, by summing up the individual output signals from the rake fingers. The combined signal generated by the summer may, and in some embodiments is, provided to additional receiver modules/circuitry for further processing. Operation proceeds from step 316 to step 318 where the combined signal is output to additional receiver circuitry for additional processing, e.g., data recovery from the received signal. The operation proceeds from step 318 back to step 304 and various steps, e.g., channel estimation, dynamic allocation, selecting and controlling steps, may be repeated, e.g., for processing additional received signals.

Figure 4:
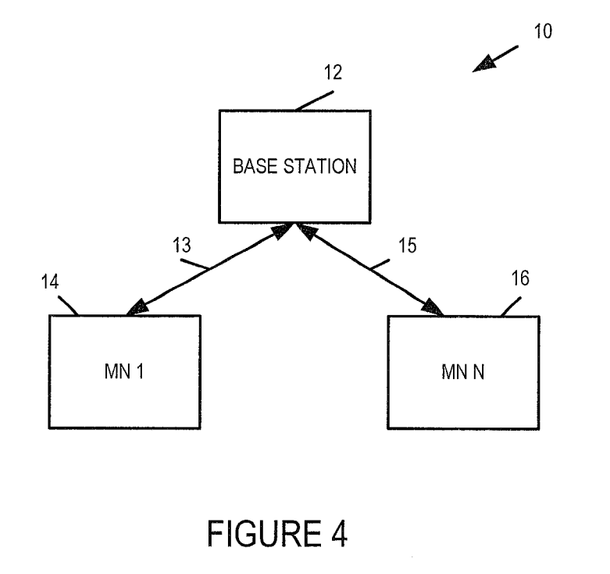
FIG. 4 illustrates a communications system in which the rake receiver may be used in any one or more of the illustrated devices, e.g., base station and wireless terminals.

FIG. 4 illustrates a communications system 10 including devices using rake receivers implemented in accordance with the invention. In the system 10, multiple wireless terminals, e.g., mobile terminals, shown as mobile nodes MN1 (14) through MN N (16) communicate with the base station 12 through the use of communication signals 13, 15. Each mobile terminal may correspond to a different mobile user and are therefore sometimes referred to as user terminals. The signals 13, 15 may be, e.g., OFDM signals. The base station 12 and mobile stations 14, 16 each implement the method of the present invention. Thus, signals 13, 15 include signals of the type discussed above, which are transmitted in accordance with the invention.

Figure 5:
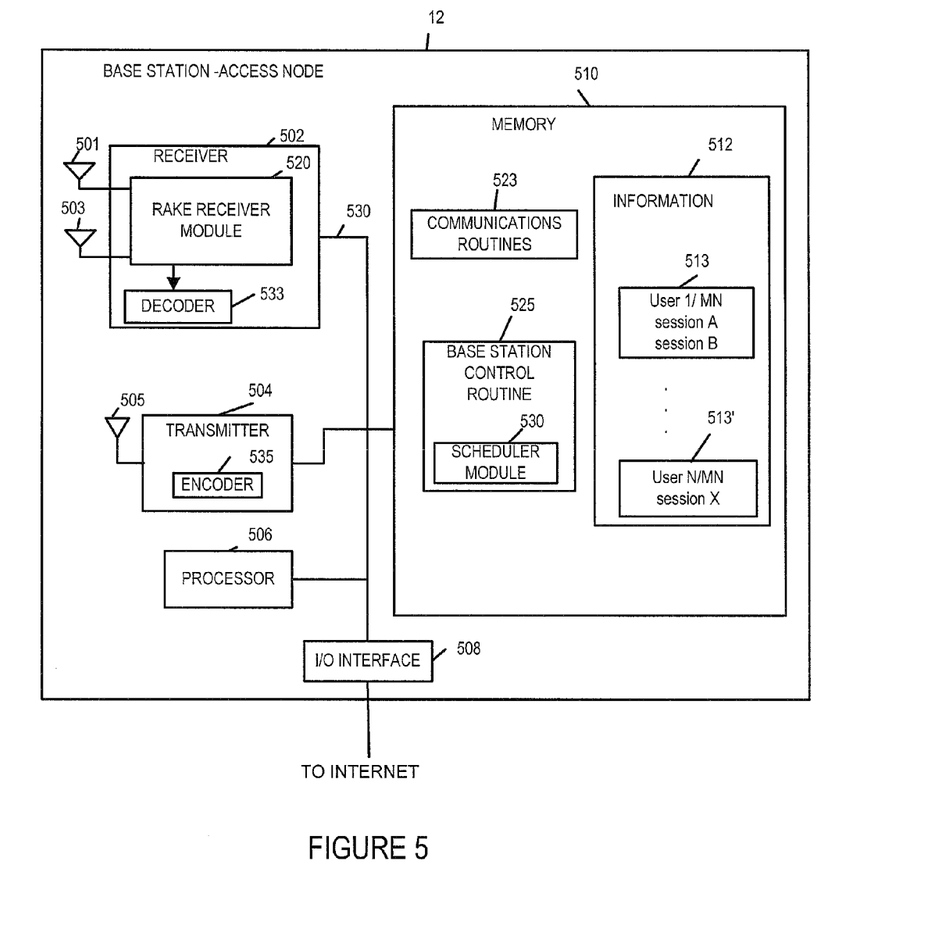
FIG. 5 illustrates a base station, e.g., an access node or femtocell, in which the rake receiver module of the present invention is used.

FIG. 5 illustrates an exemplary access router, e.g., base station 12, implemented in accordance with the invention. The base station 12 includes receiver transmitter circuitry 502, 504. The receiver circuitry 502 includes a decoder 533 while the transmitter circuitry 504 includes an encoder 535. The receiver circuitry 502 also includes a rake receiver module 520 which in some embodiments is coupled to receive antenna 501 and 503 via which the base station 12 receives signals. The transmitter 504 is coupled to transmit antenna 505 via which the base station 12 transmits signals. The circuitry 502, 504 is coupled by a bus 530 to an I/O interface 508, processor (e.g., CPU) 506 and memory 510. The I/O interface 508 couples the base station 12 to the Internet. The memory 510 includes routines, which when executed by the processor 506, cause the base station 12 to operate in accordance with the invention. Memory includes communications routines 523 used for controlling the base station 12 to perform various communications operations and implement various communications protocols. The memory 510 also includes a base station control routine 525 used to control the base station 12 to implement the steps of the method of the present invention described above. The base station control routine 525 includes a scheduling module 530 used to control transmission scheduling and/or communication resource allocation. Thus, module 530 may serve as a scheduler. Memory 510 also includes information used by communications routines 523, and control routine 525. The information 512 includes an entry for each active mobile station user 513, 513' which lists the active sessions being conducted by the user and includes information identifying the mobile station (MT) being used by a user to conduct the sessions.

Servers and/or host devices may be implemented using circuitry which is the same as, or similar to, the circuitry of the exemplary access router shown in FIG. 4 but with interfaces and/or control routines suited to the particular server/host device's requirements. The control routines and/or hardware in such servers and/or hosts cause the devices to implement the above described methods.

Figure 6:
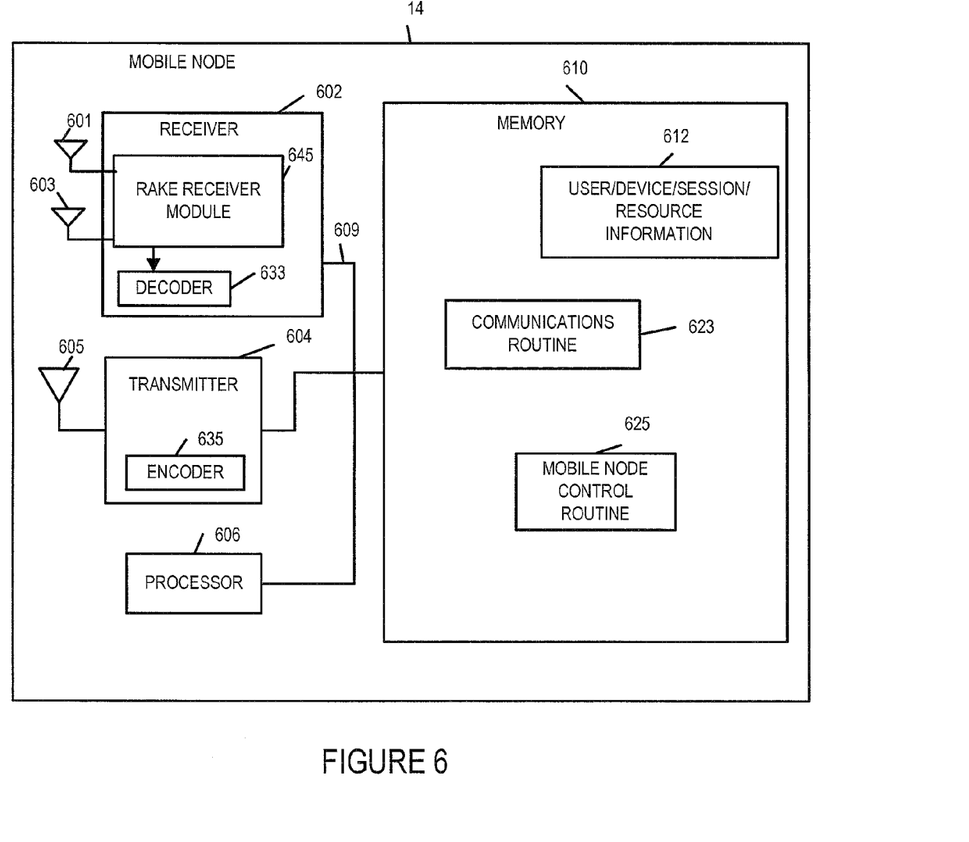
FIG. 6 illustrates a wireless terminal, e.g., mobile node, in which the rake receiver of the present invention is used.

FIG. 6 illustrates an exemplary mobile node 14 implemented in accordance with the present invention. The mobile node 14 may be used as a mobile terminal (MT). The mobile node 14 includes receiver and transmitter circuitry 602, 604. The receiver circuitry 602 includes a decoder 633 while the transmitter circuitry 604 includes an encoder 635. The receiver circuitry 602 also includes a rake receiver module 645 which in some embodiments is coupled to receive antenna 601 and 603 via which the mobile node 14 receives signals. The transmitter 604 is coupled to transmit antenna 605 via which the mobile node 14 transmits signals. The receiver transmitter circuits 602, 604 are coupled by a bus 609 to a memory 610. Processor 606, under control of one or more routines stored in memory 610 causes the mobile node to operate in accordance with the methods of the present invention as described above. In order to control mobile node operation, memory 610 includes communications routine 623, and mobile node control routine 625. The mobile node control routine 625 is responsible for ensuring that the mobile node operates in accordance with the methods of the present invention and performs the steps described above in regard to mobile node operations. The memory 610 also includes user/device/session/resource information 612 which may be accessed and used to implement the methods of the present invention and/or data structures used to implement the invention.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments devices and/or systems described herein are implemented using one or more modules to perform the steps corresponding to one or more methods, for example, performing a channel estimate for a channel corresponding to each of x antennas to generate x channel estimates, generating, for each of y individual ones of the x channel estimates, a set of complex weights and associated delays corresponding to the channel estimate, thereby producing y channel estimate sets, selecting M most significant elements of the y channel estimate sets, controlling M rake fingers as a function of the M most significant elements of the y channel estimate sets, where x, y, and M are positive integers and x and M are greater than 1, etc. Thus, in some embodiments various features are implemented using modules. Such modules may be implemented using software, hardware or a combination of software and hardware. Many of the above described methods or method steps can be implemented using computer executable instructions, such as software, included in a computer readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a computer readable medium including computer executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or apparatus and/or system. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a device or other apparatus described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

At least some of the methods and apparatus of various embodiments are applicable to a wide range of communications systems including many OFDM as well as non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of processing a received signal, comprising:
performing a channel estimate for a channel corresponding to each of x antennas to generate x channel estimates; and
dynamically allocating M rake fingers to one or more of the x antennas as a function of the x channel estimates, said dynamically allocating the M rake fingers to one or more of the x antennas including:
for each of y individual ones of the x channel estimates generating a set of complex weights and associated delays corresponding to the channel estimate, thereby producing y channel estimate sets;
selecting M most significant elements of the y channel estimate sets;
controlling the M rake fingers as a function of the M most significant elements of the y channel estimate sets, where x, y, and M are positive integers, and x and M are greater than 1; and
controlling which one or more of the x antennas are coupled to one or more individual ones of the M rake fingers at any given time, based on which elements of the y channel estimate sets were selected, each of the rake fingers being coupled to at most one antenna at a given time; and
wherein controlling the rake fingers includes controlling a delay and a complex multiplier of a first rake finger based on a delay and gain element, respectively, of one of the selected channel estimate elements used to control the first rake finger.

2. The method of claim 1, wherein the total number of rake fingers is fixed.

3. The method of claim 1, further comprising:
repeating said channel estimation, selecting, and controlling steps multiple times over a period of time.

4. The method claim 1,
wherein controlling which one or more of the x antennas are coupled to one or more individual ones of the M rake fingers at any given time includes operating a switching device, responsive to a control signal, to selectively couple one of the x antennas to multiple rake fingers of the M rake fingers in accordance with said dynamic allocation.

5. The method of claim 1, wherein each of the y channel estimate sets includes M elements; and
wherein selecting the M most significant elements of the y channel estimate sets includes selecting from M times y elements, the M most significant elements which will contribute the most to signal recovery without taking into consideration which of the y channel estimate sets the selected elements are from.

6. The method of claim 1, where y is equal to x.

7. The method of claim 1, wherein the dynamic allocation of the M rake fingers to one or more of the x antennas includes allocating the rake fingers to an individual antenna of the x antennas depending on the expected significance the individual antenna can make to recovering the received signal.

8. The method of claim 1, wherein each of the channel estimate sets include Z elements, where each of the Z elements includes at least one gain value and one delay value, Z being an integer value greater than 1.

9. The method of claim 8, wherein each of the Z elements is a gain and delay pair.

10. The method of claim 8, wherein Z equals the number of rake fingers.

11. The method of claim 1, wherein each of the y channel estimate sets includes the same number of elements.

12. The method of claim 1, wherein said controlling which one or more of the x antennas are coupled to one or more individual ones of the M rake fingers at any given time includes operating a switching device to couple a second antenna to at least one of the M rake fingers in accordance with a control signal while said one of the x antennas is coupled to multiple rake fingers of the M rake fingers in accordance with said dynamic allocation.

13. The method of claim 1, wherein said dynamic allocation of the rake fingers further includes:
supplying a control signal used for controlling a switching device to selectively couple one of the x antennas to multiple individual ones of the M rake fingers at any given time.

* * * * *